United States Patent [19]

Nelson et al.

[11] Patent Number: 5,835,720
[45] Date of Patent: Nov. 10, 1998

[54] IP DISCOVERY APPARATUS AND METHOD

[75] Inventors: Jamie Nelson, Danville; Leonard Janze, Walnut Creek; Kalpana Ravichandran, Santa Clara; Govindarajan Rangarajan, Sunnyvale, all of Calif.

[73] Assignee: Sun Microsystems, Inc., Mountain View, Calif.

[21] Appl. No.: 649,187

[22] Filed: May 17, 1996

[51] Int. Cl.⁶ .................................................. G06F 17/00
[52] U.S. Cl. ...................................................... 395/200.54
[58] Field of Search ........................... 395/200.54, 200.5, 395/200.52, 200.57, 200.75

[56] References Cited

U.S. PATENT DOCUMENTS

| | | | |
|---|---|---|---|
| 5,185,860 | 2/1993 | Wu . | |
| 5,557,748 | 9/1996 | Norris ................................. | 395/200.52 |
| 5,596,723 | 1/1997 | Romohr ............................. | 395/200.54 |
| 5,617,540 | 4/1997 | Civanlar et al. ................... | 395/200.57 |
| 5,668,952 | 9/1997 | Slane .................................. | 395/200.75 |

OTHER PUBLICATIONS

Sun Microsystems, Inc., "Soltice X.400 and Solstice X.500 Technical Brief," Apr. 1996, pp. 1–47.

*Primary Examiner*—Ellis B. Ramirez
*Attorney, Agent, or Firm*—Gary S. Williams; Flehr Hohbach Test Albritton & Herbert LLP

[57] ABSTRACT

Disclosed herein are methods and apparatus for discovering devices on a network. Active devices can be discovered in ARP tables from routers on the network. Pings can then be sent to the active devices for verification, or pings can be sent to devices at other addresses on the network. Devices can also be discovered by sending a batch of pings to addresses on the network and monitoring responses from those addresses over an interval. After the interval elapses, another batch of pings can be sent. The devices can be discovered by a host on the network or by a network manager. The network manager can add the discovered devices to a network topology database.

21 Claims, 3 Drawing Sheets

IP DISCOVERY APPARATUS AND METHOD

BACKGROUND OF THE INVENTION

The invention relates to digital communications. More specifically, the invention relates to network management.

Today, large numbers of personal computers and workstations are being interconnected with file servers, print servers, modems, hubs and other devices to form local area networks, metropolitan area networks and wide area networks. These networks allow the personal computers and workstations to share information and valuable resources among each other. Now more than ever, individuals and companies depend on networks to conduct business and to communicate with people around the world. Indeed, the network has become the computer.

A network manager is employed to control operations of devices on the network, analyze resource performance, identify and resolve faults, and automate management tasks. Track of the devices is kept by way of a network topology database. The network manager can dynamically build the database by discovering the devices that are on the network and adding the discovered devices to the database.

A conventional method of discovering devices is known as "serial pinging." The network manager sends an Internet Control Message Protocol (ICMP) echo request message to an address and waits for a response. After a response is received, or after a timeout interval expires, the network manager sends an ICMP echo request message to the next serial address. These steps are performed until ICMP echo request messages have been sent to all addresses on the network. The devices that respond are added to the network topology database.

Serial pinging has its problems. For one, it can be take a very long time to discover a device. Networks of the class C type support up to 255 addresses, but not all of those addresses will be active. Even though only 5 devices might be active on a class C network, requests would still be sent serially to all 255 addresses. Waiting 3 or 4 seconds for each non-response at 250 addresses, the network manager could take as long as 16 minutes to locate a host on a class C network. The problem is far greater with class B networks (which support up to 65,000 addresses) and class A networks (which support up to 65 million addresses). On a class A network it could take as long as a week to locate a host.

Another problem with serial pinging is that it increases the traffic on the network and, consequently, slows down other devices on the network. Many devices stop communicating with other devices in order to respond to an ICMP echo response request message.

Yet another problem with pinging is that the method, as exhaustive as it might be, is not guaranteed to identify all devices on a network. Some routers, when busy, will ignore ICMP echo request messages altogether.

SUMMARY OF THE INVENTION

These problems are overcome by apparatus and methods according to the present invention. A first method of discovering devices on a network comprises the steps of accessing an ARP table from at least one device on the network; and using each accessed ARP table to identify other devices on the network. The first method can discover devices on the network at far greater speed than the conventional method of sending pings. The first method also creates far less traffic on the network when discovering the devices.

A second method of discovering devices on a network comprises the steps of sending batches of pings to different addresses on the network; and, for each batch, waiting an interval for responses from devices at those addresses. After the interval elapses, another batch of pings is sent. The second method is also faster than the conventional method of sending pings. It can be performed independent of, or in combination with, the first method of discovering devices on a network.

A method of determining a hierarchical structure of a network comprises the steps of accessing routing tables to identify routers on the network; accessing address translation tables from the routers to identify other devices on the network; and saving IP addresses of the routers and the other devices on the accessed routing tables and address translation tables.

An apparatus for discovering devices on a network comprises a processor for accessing at least one routing table, identifying gateways within N hops on each routing table that is accessed, where N is a positive integer, accessing ARP tables from the gateways that are identified, and identifying devices on the ARP tables that are accessed.

A network manager for managing addressable devices on at least one network comprises a processor and memory for storing a network topology database and a plurality of executable instructions. When executed, the instructions instruct the processor to use routing tables to identify routers within N hops; retrieve ARP tables from the identified routers; identify devices on the retrieved ARP tables; access information from the identified devices; and add the information to the network topology database.

The invention also includes a computer storage medium that stores a plurality of executable instructions for instructing a computer to discover devices on a network. The plurality of instructions comprises instructions which instruct the computer to use routing tables to identify gateways within N hops; instructions which instruct the computer to retrieve the address translation tables from the identified gateways; and instructions which instruct the computer to identify devices on the retrieved address translation tables.

DETAILED DESCRIPTION OF THE INVENTION

Figure 1:
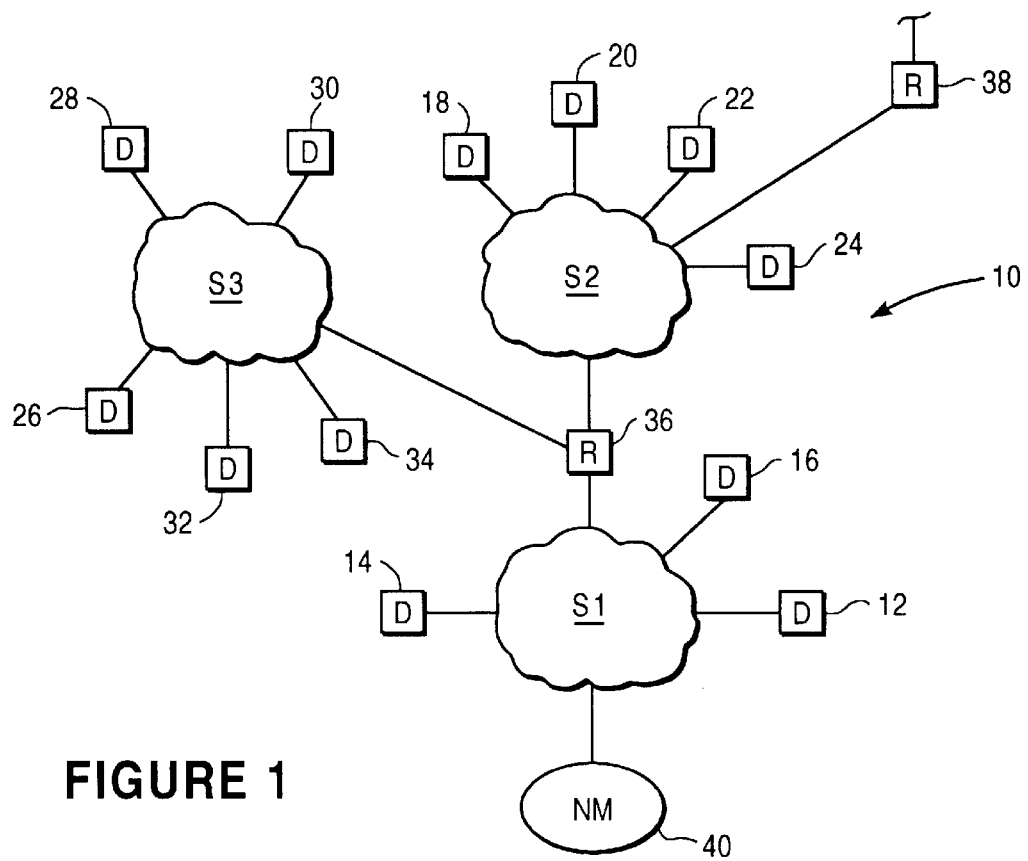
FIG. 1 is a schematic diagram of a network including a network manager according to the present invention.

FIG. 1 shows a network 10 which, for illustrative purposes, includes first, second and third subnets S1, S2 and S3. The subnets S1, S2 and S3 can have the same topology or they can have different topologies. The topologies include, but are not limited to, Token ring, Ethernet, X.25 and FDDI. Devices 12, 14 and 16 are connected to the first subnet S1; devices 18, 20, 22 and 24 are connected to the second subnet S2; and devices 26, 28, 30, 32 and 34 are connected to the third subnet S3. The devices 12–34 can be workstations, personal computers, hubs, printers, etc. Additional devices on the network 10 include a first router 36 for interconnecting the first, second and third subnets S1, S2 and S3; and a second router 38 for connecting the second subnet S2 to other networks. The network 10 is scalable, which allows computing resources to be added as needed. Although only several devices 12–38 are shown, the network 10 can encompass tens of addressable devices up to tens of thousands of addressable devices.

TCP/IP is used to regulate how data is packeted into IP packets and transported between the devices 12–38. Each device 12–38 has a physical address and a unique Internet protocol (IP) address. The IP address includes a network number and a host number. The host number is broken down into a subnet part and a host part.

Take a first example in which IP packets are sent from a source device on the first subnet S1 (device 12, for example) to a destination device on the first subnet S1 (device 14, for example). The IP packets contain the IP address of the destination device 14. The subnet part of the destination IP address indicates that the destination device 14 is local, so the source device 12 retrieves its local ARP (Address Resolution Protocol) table from its ARP cache. The ARP table is used for mapping the IP address onto a physical address. If the destination IP address is found on the ARP table, the source device 12 reads the physical address off the local ARP table, adds appropriate headers (including the physical address of the destination device 14) to the IP packets, and sends the resulting frame over the first subnet S1.

If the destination device 14 is not on the ARP table, the source device 12 issues an ARP request to locate the destination device 14. The ARP request includes the IP and physical addresses of the source device 12 and the IP address of the destination device 14. All devices receiving the ARP request check to see if their IP address matches the destination IP address in the ARP request. Of course, the destination device 14 makes a match and responds by returning its physical address to the source device 12. The source device 12 makes an entry for the destination device 14 in its ARP table (the entry including the physical address of the destination device 14), adds the physical address of the destination device 14 to the IP packets, and transmits the resulting frames over the first subnet S3.

Take a second example in which IP packets are sent from the source device 12 to a destination device on the third subnet S3 (device 30, for example). The subnet part of the destination IP address indicates that the destination device 30 is not local, so the source device 12 retrieves its local routing table from the ARP cache. The local routing table contains information needed to route the IP packets to next-hop gateways. The information includes entries that indicate the next-hop routers by their IP addresses. At a minimum, the local routing table contains an entry for a default router. In this example, the default router is the first router 36. The routing table may also contain many other entries for other gateways on the network 10. The source device 12 forwards the IP packets to the first router 36.

The first router 36 receives the IP packets and retrieves an IP address table from its ARP cache. The IP address table includes an address for each interface. In this example, the IP address table includes IP address 129.144.74.1 for the first subnet S1, IP address 129.144.75.1 for the second subnet S2, and IP address 129.144.76.1 for the third subnet S3. By masking the destination IP address to obtain its subnet part (a mask from the IP address table is used) and comparing the masked IP address to the addresses in the IP address table, the first router 36 determines that the IP packets should be sent to the third subnet S3. The first router 36 looks at its ARP table (which was retrieved with the IP address table) for the physical address of the destination device 30. The first router 36 maintains an ARP table of the devices that have been active (i.e., communicating) over an interval (e.g., five minutes). If the destination IP address is not on its ARP table, the first router 36 issues an ARP request. After the destination device 30 is found, the first router 36 adds the destination physical address to the IP packets and transmits the resulting frames over the third subnet S3 to the destination device 30.

Had the destination IP address not fit in one of the subnets on the IP address table, the first router 36 would have checked its routing table (which was also retrieved with the IP address table) and forwarded the IP packets to the next-hop router (i.e., the second router 38).

The network 10 additionally includes a network manager 40, which is connected to the first subnet S1. Simple Network Management Protocol(SNMP) is used by the network manager 40 for managing the devices 12–38 that support SNMP. The devices 12–38 that do not support SNMP can be managed by a protocol such as ICMP. Each SNMP-manageable device stores in its memory a Management Information Base (MIB). The MIB is a collection of objects or variables representing different aspects of the device (e.g., configuration, statistics, status, control). Each device is associated with an agent, which is a software program that may or may not be resident in the device. The agents allow the network manager 40 to access the MIB of each SNMP-manageable device. Such accessibility allows the network manager 40 to perform its management tasks. For a general description of network management, see W. Stallings, "Data and Computer Communications", MacMillan (4th ed, 1994) pp. 701–24, which is incorporated herein by reference.

Figure 2:
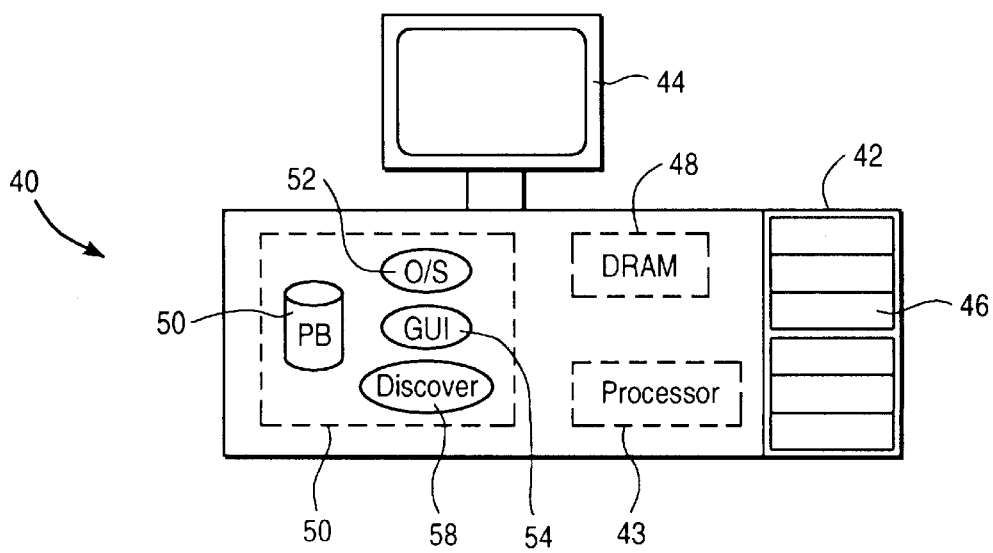
FIG. 2 is a block diagram of the network manager according to the present invention.

FIG. 2 shows the network manager 40 in greater detail. The network manager 40 includes a workstation 42 such as a SPARCstation™ or SPARCserver™. Both of these models use a RISC-based high-performance "SPARC" microprocessor 43. The SPARCstation™, SPARCserver™, and "SPARC" microprocessor are all commercially available from Sun Microsystems, Inc., the assignee of the present invention. The workstation 42 is configured with a color display monitor 44 and a CD ROM drive 46 for distribution media. It is also configured with volatile memory 48 such as DRAM and non-volatile memory 50 such as a hard drive.

The Network Manager 10 includes a "UNIX"-based operating system 52. Operating systems for the "SPARC" microprocessor include "SOLARIS" 2.4 or greater and "SOLARIS" 1.x or later. The "SOLARIS" operating systems are also commercially available from the assignee of the present invention. The operating system 52 is stored on the network manager's hard drive 50.

Also stored on the hard drive 50 is software for directing the network manager 40 to perform its many tasks. The software includes a Graphical User Interface (GUI) 54, a network topology database 56 and a Discover program 58. Running the Discover program 58, the network manager 40 seeks out IP and SNMP-addressable devices on the network 10, and adds instances of discovered devices to the network topology database 56.

The Discover program 58 can be distributed on a portable computer memory medium, such as a CD ROM. Distributed as such, the CD ROM is inserted into the CD ROM drive 46 and the Discover program 58 is installed onto the hard drive 50. Instead of installing the Discover program 58 onto the hard drive 50, however, it can be accessed directly from the CD ROM drive 46.

The Discover program 58 can be run directly from the operating system 52. The location and name of the Discover program's executable file are typed in at the command line. Specifiers can also be typed in at the command line, or they can be provided in a configuration file. If no specifiers are typed in at the command line, default specifiers are used. The specifiers, which provide options for running and configuring the program, will be discussed below.

In the alternative, the Discover program 58 can be run from the GUI 54. A Discover program icon is double clicked, causing a Discover Properties dialog box to appear. The Discover Properties dialog box shows the current configuration of the Discover program, provides an option that allows the Discover program to be reconfigured with new specifiers, and a button for running the Discover program 58 as currently configured. The GUI 54 can be created using OpenWindows™ 3.1 or later, or any other library of graphical user interface classes.

Figure 3:
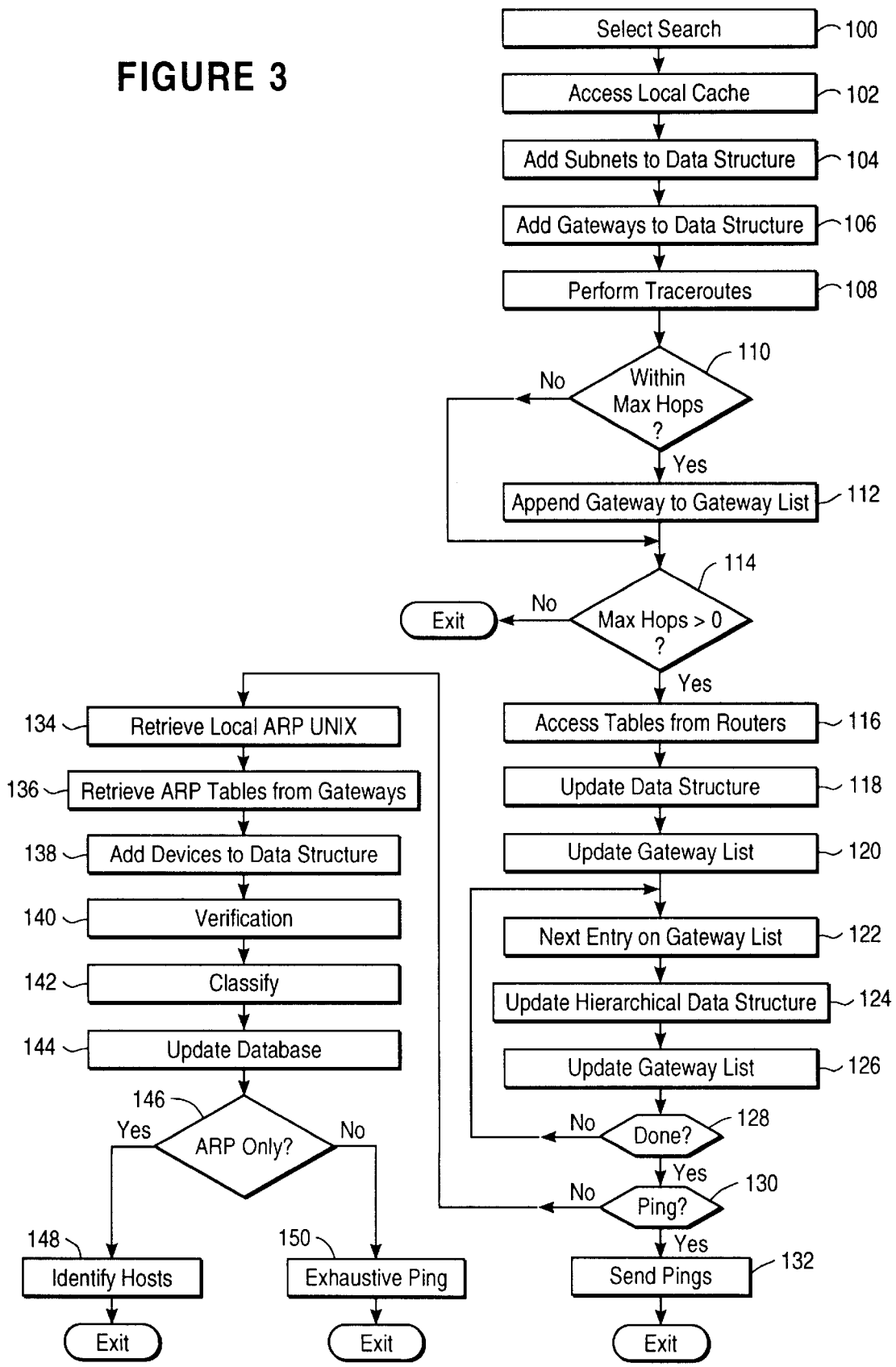
FIG. 3 is a flowchart of a method of discovering devices on a network, the method being performed by the network manager according to the present invention.

Reference is now made to FIG. 3, which shows the steps performed by the network manger 40 under the direction of the Discover program 58. The Discover program 58 offers a choice of searches: an ARP/Ping search, an ARP-only search, and a Ping search (step 100). One is selected. The ARP/Ping search is selected by default. If it is desired to perform either the ARP-only search or the Ping search, a specifier (e.g., -A or -P) is typed in at the command line or button (e.g., ARP-only button or Ping button) is clicked on in the Discover Properties dialog box.

The network manager 40 begins with the steps of building a hierarchical data structure of the network topology. The hierarchical data structure indicates networks, subnets for each network, and gateways, hosts and links (physical and logical) for each subnet. The data structure is stored in non-volatile memory 50. To build the hierarchical data structure, the network manager 40 accesses its IP address table and local routing table in its ARP cache (step 102). IP addresses in the IP address table, which are used to identify the subnets, are added to the hierarchical data structure (step 104). The local routing table is used to identify a default router. The local routing table might also identify additional gateways. IP addresses of the default router and any other gateways are added to the hierarchical data structure (step 106).

The IP addresses of the routers are also added to a Gateway list, which is stored in memory 48 or 50. Before a gateway is saved in the Gateway list, however, the network manager 40 performs a traceroutes operation to determine the number of hops to that gateway (step 108). Each gateway that a packet must traverse is counted as a hop. The traceroutes operation also identifies physical and logical links, which are added to the hierarchical data structure (step 110). If a gateway is within a "Maximum Hops" threshold, its IP address is appended to the Gateway list (step 112). By default, the Maximum Hops threshold is set to zero so that only the local ARP cache is accessed.

If the Maximum Hops threshold is greater than zero (step 114), the network manager 40 retrieves the routing table, IP address table and ARP table of the default router using a series of SNMP Get_Next messages (step 116). The default router's IP address table indicates the IP addresses of the subnets S2 and S2 and any other interfaces. IP addresses of the interfaces are added to the hierarchical data structure (step 118). The default router's routing table identifies other gateways, which are added to the hierarchical data structure. Only IP addresses of those gateways within the Maximum Hops threshold are appended to the Gateway list (step 120).

If the default router does not support SNMP, the network manager 40 can use the traceroutes operation to find additional gateways. If additional gateways are found, their IP address tables, routing tables and ARP tables are retrieved. Gateways within the Maximum Hops threshold are appended to the Gateway list.

The network manager 40 then proceeds down the Gateway list. Routing tables, IP address tables and ARP tables of the next entry on the Gateway list are retrieved (step 122). Newly-discovered networks, subnets and gateways are added to the hierarchical data structure (step 124), and newly-discovered gateways within the Maximum Hops threshold are appended to the Gateway list (step 126). By appending newly discovered gateways to the Gateway list and advancing down the Gateway list, the network manager 40 leapfrogs from gateway to gateway, identifying even more routers, subnets and networks. Once the network manager 40 has reaches the end of the Gateway list (step 128), it has completed the construction of the hierarchical data structure.

The steps 102–128 of building the hierarchical data structure can be skipped or modified if a Search file containing specific gateways is made accessible to the Discover program 58. The gateways in the Search file are identified by their IP addresses. If a specifier (e.g., "ONLY") is provided in the Search file, the search is limited only to those gateways specified in the Search file. If the specifier is omitted, the search begins with those gateways specified in the Search file and then continues with the search above, accessing routing tables and IP address tables from all gateways within the Maximum Hops threshold. Any gateway that is unreachable is ignored. The name of the Search file can be entered on the command line of the operating system or through the Discover Properties dialog box of the GUI 54.

After the hierarchical data structure has been built, the network manager 40 performs a search. If the Ping search is selected (step 130), the network manager 40 sends ICMP echo request messages over the network 10 (step 132). The network manager 40 can be programmed to send out the ICMP echo request messages to all addresses on the network in a conventional manner, or it can be programmed to perform a "Fast Ping," as described below in connection with FIG. 4.

If either the ARP/Ping or the ARP-only search is selected, the network manager 40 retrieves its local ARP, IP address and routing tables using UNIX system calls (step 134). Then, using SNMP requests, the network manager 40 retrieves the ARP tables from all gateways listed in the Gateway list (step 136). For example, the network manager 40 might find the following ARP table from the first router 36:

| Device | IP address | IP Name | Mask | Phys Addr |
|---|---|---|---|---|
| 16 | 129.144.74.1 | udmpk16c-74 | 255.255.255.255 | 00:40:0b:40:76:1d |
| 12 | 129.144.74.5 | dakota-74 | 255.255.255.255 | 00:40:0b:40:f6:45 |
| 14 | 129.144.74.34 | cicada-74 | 255.255.255.255 | 00:40:0b:40:f6:43 |
| 20 | 129.144.75.12 | certo | 255.255.255.255 | 08:00:20:76:a3:9f |
| 22 | 129.144.75.15 | emp | 255.255.255.255 | 08:00:20:10:2c:e7 |
| 24 | 129.144.75.114 | measures-74 | 255.255.255.255 | 08:00:20:76:78:37 |

The network manager 40 immediately saves the IP addresses from the ARP table in the hierarchical data structure (step 138). The network manager 40 can also ping each device that it finds in the ARP table (step 140). This step is performed for verification purposes.

The network manager 40 also immediately classifies the devices (step 142) and updates the network topology database 56 with the classified devices (step 144). Classification can be performed by reading the device's SNMP system description (e.g., sysobject ID) and mapping the system description to a particular device class. The network topology database 56 is essentially an internal hierarchy of data structure files and instance files. The data structure files include structures of devices, views (collections of devices), buses (e.g., a Token Ring LAN segment) and connections (e.g., an RS-232 link). The network manager 40 polls the MIB of each discovered device for system information. The system information is passed to an Applications Program Interface (API) which, using basic API calls, creates instance files of the data structures and adds the instance files to the network topology database 56. For a description of network topology databases, see C. Malamud, "Analyzing Sun Networks", Van Nostrand Reinhold (1992) pp. 419–21, which is incorporated herein by reference.

If the ARP-only search was selected (step 146), the network manager 40 might try to identify hosts (step 148). If the ARP/Ping search is selected, the network manager 40 performs a more exhaustive search on the network, sending ICMP echo request messages to the remaining addresses of the subnets listed in the Hierarchy file (step 150). The ICMP echo request messages can be sent in a conventional manner, or they can be sent using the Fast Ping method described above in connection with FIG. 4.

Figure 4:
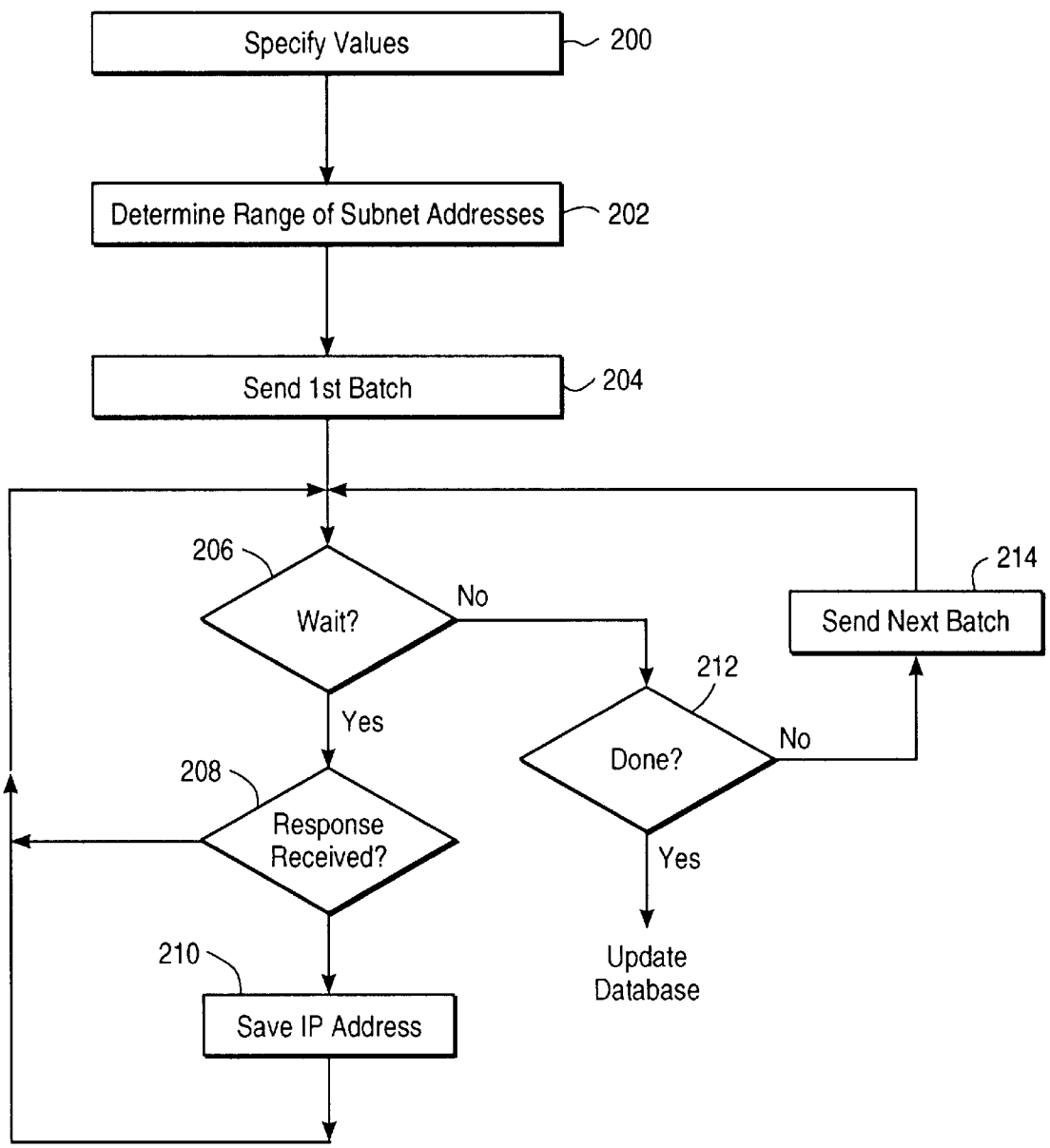
FIG. 4 is a flowchart of a Fast Ping method according to the present invention.

FIG. 4 shows the steps for performing the Fast Ping search. In step 200, the following values are specified before the ICMP echo request messages are sent as IP packets by the network manager 40:

1. A maximum number L of outstanding ICMP echo request messages per batch.
2. A time T between transmissions of the batches of ICMP echo request messages.
3. A number of times R an ICMP echo request message is sent to a device.

The values can be provided by a configuration file when the Discover program 58 is run from the command line, or the values can be provided via the Discover Properties dialog box. If a value is not provided to the Discover program 58, a default value is used. The default value for the maximum number of outstanding pings L is 10, which allows only a single ICMP echo request message to be sent at any one time. The default value for the time T between transmissions of the batches of ICMP echo requests is three seconds, which commands the network manager 40 to wait three seconds before sending the next batch of ICMP echo request messages. The default value for the number of times R an ICMP echo request message is sent to a particular address is also 1, which commands the network manager to send only a single ICMP echo request message to an address.

The Fast Ping search is not exhaustive; it is performed only on those subnets and networks that have been identified in the hierarchical data structure. The network manger 40 determines a range of IP addresses for each subnet from the hierarchical data structure (step 202). Batches of ICMP echo request messages are sent to each subnet within the corresponding range of IP addresses. The initial batch of messages can be sent to the first L addresses on a subnet (step 204). The ICMP echo request messages in a batch are sent in succession, as fast as the network manager 40 can send them. The network manager 40 then waits for responses to the ICMP echo request messages (step 206). If a response is received (step 208), the network manager 40 saves the IP address of the responding device in the hierarchical data structure and network topology database 56 (step 210) and thereafter waits for additional responses (step 206). The network manager 40 continues waiting for responses until time T elapses or until all responses to all L requests have been received.

If ICMP echo request messages have been sent to the addresses of all subnets and networks in the hierarchical data structure (212), the Fast Ping method is completed. Otherwise, the network manager 40 keeps track of the IP addresses that have responded, the ones that have not responded, the number of ICMP echo request messages that have been sent to a particular address, and it accordingly sends the next batch of ICMP echo request messages (step 214).

The network manager 40 can use the Fast Ping method to perform a mini-sweep of the network. The network manager 40 sends out a batch of fifty ICMP echo request messages to the first fifty IP addresses of a subnet. Within a three second interval, five responses are queued by the network manager 40. IP addresses of the five responding devices are stored in the hierarchical data structure and network topology database 56. After three seconds elapse, the network manger 40 sends another batch of ICMP echo request messages to fifty IP addresses: the forty five addresses that did not respond, and the fifty first address through the fifty fifth addresses. Two more intervals of three seconds elapses and no additional responses are received. The network manager 40 then formulates a new batch of fifty addresses: the fifty first address to the fifty fifth address, and the fifty sixth address though the one hundred and fifth address. In this manner, the network manager 40 continues to send out batches of ICMP echo request messages until all addresses in the Hierarchy file have been pinged. The mini-sweep is faster to perform than the conventional method of pinging devices.

Thus disclosed are apparatus and methods for discovering devices on a network quickly and efficiently, without creating excessive network traffic. Using any of the methods, a network manager can build a network topology database.

It is understood that various changes and modifications may be made without departing from the spirit and scope of the invention. Although, certain methods above have been described in connection with ARP tables, the methods can use any other table that maps an IP address to a physical address. ARP tables happen to be standard for SNMP-managed networks The invention is not limited to network managers including workstations having RISC processors that run "UNIX"-based operating systems. For example, the network manager can include a personal computer having an x86 or "PENTIUM" processor that runs a 32-bit "UNIX"-based operating system such as "SOLARIS 2.4." The operating system does not even have to be UNIX-based.

More generally, however, the above-methods of discovering devices can be run on any host that is capable of sending pings to other devices and/or accessing ARP tables from other devices. Accordingly, the present invention is not limited to the precise embodiments described hereinabove. Instead, it is defined by the claims that follow.

We claim:

1. A method of discovering devices on a network, comprising the steps of:
   accessing an ARP (Address Resolution Protocol) table from at least one device on the network;
   using each accessed ARP table to identify other devices on the network;
   identifying additional devices on the network by:
      sending at least two batches of pings to addresses of devices that have not been identified in accessed ARP tables; and
      after sending each batch of pings, waiting an interval for responses from any devices at the addresses to which the pings were sent;
      wherein the step of sending a batch of pings comprises sending pings to multiple addresses without waiting for responses until all the pings have been sent to the multiple addresses.

2. The method of claim 1, wherein the step of accessing an ARP table from at least one device includes the step of accessing a local ARP table.

3. The method of claim 1, wherein the step of accessing an ARP table from at least one device includes the steps of:
   identifying a number N of gateways on the network, where N is a positive integer; and
   retrieving an ARP table from at least one of the identified gateways.

4. The method of claim 3, wherein the step of accessing an ARP table from at least one device includes the steps of retrieving ARP tables from hosts identified in the retrieved ARP tables.

5. The method of claim 3, wherein the step of accessing an ARP table from at least one device further includes the steps of:
   accessing routing tables to identify gateways;
   determining a number of hops to each of the gateways in the routing tables; and
   retrieving ARP tables from the identified gateways that are within a maximum hops threshold.

6. The method of claim 5, wherein the number of hops is determined by performing a traceroutes operation, and wherein the step of accessing an ARP table from at least one device further includes the steps of:
   searching for gateways that are revealed by the traceroutes operation; and
   retrieving ARP tables from the gateways that are revealed by the traceroutes operation.

7. The method of claim 5, wherein the step of accessing an ARP table from at least one device further includes the steps of:
   identifying additional gateways from ARP tables of previously-identified gateways; and
   retrieving ARP tables from the additional gateways that are within the maximum hops threshold.

8. The method of claim 1, wherein the step of accessing an ARP table from at least one device on the network further includes the steps of
   accessing a file identifying at least one gateway; and
   only retrieving an ARP table from each gateway identified in the file.

9. The method of claim 1, wherein the step of accessing an ARP table from at least one device on the network further includes the steps of:
   accessing a file identifying at least one gateway;
   retrieving an ARP table from each gateway identified in the file; and
   searching for ARP tables from additional gateways on the network.

10. The method of claim 1, wherein a ping is sent to each device that is identified in an ARP table.

11. The method of claim 1, wherein
    the step of accessing ARP tables and identifying devices on the network includes identifying routers on the network and accessing IP address tables from the identified routers;
    the step of sending the batches of pings includes the steps of:
       identifying subnets of the network from the IP address tables of the routers; and
       sending the pings to IP addresses of all undiscovered devices on the subnets.

12. A method of determining a hierarchical data structure of a network, comprising the steps of:
    accessing routing tables to identify routers on the network;
    accessing address translation tables and IP address tables from the identified routers to identify other devices on the network;
    saving IP addresses of the routers and the other devices on the accessed routing tables and address translation tables; and
    identifying additional devices on the network by:
       identifying subnets of the network from the IP address tables of the identified routers; and
       sending pings to IP addresses of undiscovered devices on the subnets.

13. The method of claim 12, further comprising the step performing traceroutes operations to determine physical and logical links on the network.

14. A method of discovering devices on a network, comprising the steps of:
    sending batches of pings to different addresses on the network; and
    for each batch, waiting an interval for responses from devices before sending out another batch of pings, whereby the devices that respond to the pings are discovered;
    wherein each batch of pings is sent by transmitting pings to multiple addresses without waiting for responses until all the pings have been transmitted to the multiple addresses.

15. The method of claim 14, further comprising the step of identifying subnets of the network, wherein the batches are sent to the identified subnets.

16. A computer program product for use in conjunction with a computer system, the computer program product comprising a computer readable storage medium and a computer program mechanism embedded therein, the computer program mechanism comprising:

a network management module for discovering devices on a network, the network management module including instructions for:

accessing an ARP (Address Resolution Protocol) table from at least one device on the network;

using each accessed ARP table to identify other devices on the network; and identifying additional devices on the network by:

sending at least two batches of pings to addresses of devices that have not been identified in accessed ARP tables; and after sending each batch of pings, waiting an interval for responses from any devices at the addresses to which the pings were sent;

wherein the step of sending a batch of pings comprises sending pings to multiple addresses without waiting for responses until all the pings have been sent to the multiple addresses.

17. The computer program product of claim 16, wherein the network management module further includes instructions for:

accessing routing tables to identify gateways;

determining a number of hops to each of the gateways in the routing tables; and retrieving ARP tables from the identified gateways that are within a maximum hops threshold.

18. The computer program product of claim 17, wherein the number of hops is determined by performing a traceroutes operation, and wherein instructions for accessing an ARP table from at least one device further includes instructions for:

searching for gateways that are revealed by the traceroutes operation; and retrieving ARP tables from the gateways that are revealed by the traceroutes operation.

19. The computer program product of claim 16, wherein the instructions for accessing ARP tables and identifying devices on the network includes instructions for identifying routers on the network and accessing IP address tables from the identified routers;

the instructions for sending batches of pings includes instructions for:

identifying subnets of the network from the IP address tables of the routers; and sending the pings to IP addresses of all undiscovered devices on the subnets.

20. A computer program product for use in conjunction with a computer system, the computer program product comprising a computer readable storage medium and a computer program mechanism embedded therein, the computer program mechanism comprising:

a network management module for discovering devices on a network, the network management module including instructions for:

sending batches of pings to different addresses on the network; and for each batch, waiting an interval for responses from devices before sending out another batch of pings, whereby the devices that respond to the pings are discovered;

wherein each batch of pings is sent by transmitting pings to multiple addresses without waiting for responses until all the pings have been transmitted to the multiple addresses.

21. The computer program product of claim 20, wherein the network management module further includes instructions for identifying subnets of the network, wherein the batches of pings are sent to the identified subnets.

* * * * *